United States Patent [19]

Masaki et al.

[11] Patent Number: 4,651,281
[45] Date of Patent: Mar. 17, 1987

[54] ANTISKID CONTROL WITH WHEEL-SPEED DIFFERENCE COMPENSATION

[75] Inventors: Syouichi Masaki; Kimio Tamura, both of Anjo; Teruyoshi Wakao, Nagoya; Noriyuki Nakashima, Nagoya; Ken Asami, Nagoya; Kazunori Sakai, Nagoya, all of Japan

[73] Assignees: Nippondenso Co., Ltd., Kariya; Toyota Jidosha Kabushiki Kaisha, Toyota, both of Japan

[21] Appl. No.: 638,721

[22] Filed: Aug. 8, 1984

[30] Foreign Application Priority Data

Aug. 9, 1983 [JP] Japan .................................. 58-145256

[51] Int. Cl.⁴ .......................... B60T 8/34; B60T 8/78; B60T 8/88
[52] U.S. Cl. .................................... 364/426; 303/100; 303/103; 303/110
[58] Field of Search ........................ 303/93, 95, 97, 99, 303/100, 103, 105, 106, 110; 364/426

[56] References Cited

U.S. PATENT DOCUMENTS

| Re. 30,763 | 10/1981 | Hirzel et al. | 364/426 |
| Re. 31,383 | 9/1983 | Leiber et al. | 364/426 |
| 3,944,291 | 3/1976 | Lindemann et al. | 303/100 |
| 3,951,467 | 4/1976 | Fleagle | 303/106 |
| 4,146,276 | 3/1979 | Brearley et al. | 303/97 |
| 4,285,042 | 8/1981 | Ohmori et al. | 364/426 |
| 4,321,676 | 3/1982 | Ohmori et al. | 364/426 |
| 4,370,715 | 1/1983 | Leiber | 364/426 |
| 4,395,761 | 7/1983 | Sato et al. | 364/426 |
| 4,451,889 | 5/1984 | Beckmann et al. | 364/426 |
| 4,466,066 | 8/1984 | Saumweber et al. | 364/426 |
| 4,499,543 | 2/1985 | Matsuda | 364/426 |
| 4,552,413 | 11/1985 | Fujii et al. | 364/426 X |

Primary Examiner—Felix D. Gruber
Attorney, Agent, or Firm—Cushman, Darby & Cushman

[57] ABSTRACT

In an antiskid control system the speed of a vehicle wheel is compared with a variable threshold which is a function of the speed of the vehicle and a first comparator output is generated when the speed is lower than the variable reference. The acceleration of the wheel is compared with a predetermined threshold for generating a second comparator output when the acceleration is lower than the threshold or a third comparator output when the acceleration is higher than the threshold. The fluid pressure of the braking system is lowered in response to there being a simultaneous presence of the first and second comparator outputs and raised in response to there being a simultaneous presence of the first and third comparator outputs.

5 Claims, 12 Drawing Figures

ANTISKID CONTROL WITH WHEEL-SPEED DIFFERENCE COMPENSATION

BACKGROUND OF THE INVENTION

The present invention relates to an antiskid control system.

In conventional antiskid control systems, the down pressure timing of hydraulically operated brakes is determined by a first down pressure decision threshold with which detected wheel speed values are compared and by a second down pressure decision threshold with which wheel acceleration values are compared to determine the optimum slip rate of the wheels. With antiskid control systems of this type, the threshold values are determined by the vehicle speed which is from the maximum wheel speed value. However, differences in wheel diameter between wheels may cause a down-pressure operation to occur at false timing. More specifically, if a given wheel has a lower tire pressure than the other wheels, the diameter of the given wheel is smaller than the others and its apparent wheel speed is greater than the speed of any other wheel. This apparent wheel speed is then taken as a maximum speed. Thus, the estimated vehicle speed value is higher than is required for optimum operation of the brakes of the other wheels. Such situations may also occur in a vehicle running on a curved path. On a right-turn curve, for example, the front right wheel would turn at speeds lower than the front left wheel, so that the front right wheel speed Vwr becomes smaller than the front left wheel speed Vwl. At time Ta this reduces below down pressure decision threshold Vs, as shown in FIG. 1. Pressure down operation thus occurs prematurely and the fluid pressure on a vehicle wheel following a smaller radius reduces excessively in comparison with the fluid pressure on the wheel on the other side of the axle.

SUMMARY OF THE INVENTION

Accordingly, the present invention provides an antiskid control system which compensates for speed differences between wheels to prevent premature reduction of brake pressure.

In the antiskid control system of the present invention the rotational speed and acceleration of a vehicle wheel are detected. A first comparator compares the wheel speed value with a threshold which is variable as a function of the speed of the vehicle and generates a first comparator output when the speed is lower than the variable threshold. The wheel acceleration is compared with a predetermined threshold value for generating a second comparator output when the acceleration is lower than the threshold. The outputs of the first and second comparators establish one of four conditions; a first condition in which the first and second comparator outputs do not exist, a second condition in which only the second comparator output exists, a third condition in which both of the first and second comparator outputs coexist and a fourth condition in which only the first comparator output exists. A pressure lowering device provided for the vehicle's braking system is disabled in response to the first condition, to the fourth condition occuring prior to the third condition and to the fourth condition occuring immediately following the third condition of short-duration and is enabled in response to the second and third conditions. The enablement is continued in response to the fourth condition of occurrence immediately following the third condition of long-duration.

In operation, if light braking is applied on a straight roadway drive, a series of first and second conditions, short-term third condition and fourth condition occurs and the pressure lowering device is disabled in response to the first condition, then enabled in response to the second and third conditions successively and is enabled again in response to the fourth condition. If heavy braking is applied on the straight roadway drive, a series of first and second conditions, long-term third condition and fourth condition occurs and the pressure lowering device is disabled in response to the first condition, then enabled in response to the second and third conditions successively and continuously enabled in response to the fourth condition.

If wheel speeds differ between the wheels on the inner and outer radii when the vehicle is cornering and if brake is applied for a short duration, only the fourth condition or a recycling series of the fourth condition and a short-term third condition occurs, so that the pressure lowering device is disabled in response to the initial fourth condition and enabled for a short period in response to the short-term third condition and the enablement is continued in response to a fourth condition following the short-term third condition. In this way, road surface noise which occurs during light brake cornering is absorbed and excessive pressure reduction is thus prevented. If a similar situation occurs except that the brake is applied for a longer duration, a series of a fourth condition and a long-term third condition occurs, so that the pressure lowering device is disabled initially in response to the fourth condition and then enabled again in response to the occurrence of a subsequent fourth condition. In this way, premature pressure relief is prevented.

Preferably, a counter is provided to measure the period of time in which the first and third comparator outputs are simultaneously present and generating a counter output if the measured period is greater than a predetermined period. When the acceleration rises above the threshold, the lowering of the fluid pressure is prevented until the counter output is generated.

BRIEF DESCRIPTION OF THE DRAWINGS

The present invention will be described in further detail with reference to the accompanying drawings, in which.

DETAILED DESCRIPTION

Figure 1:
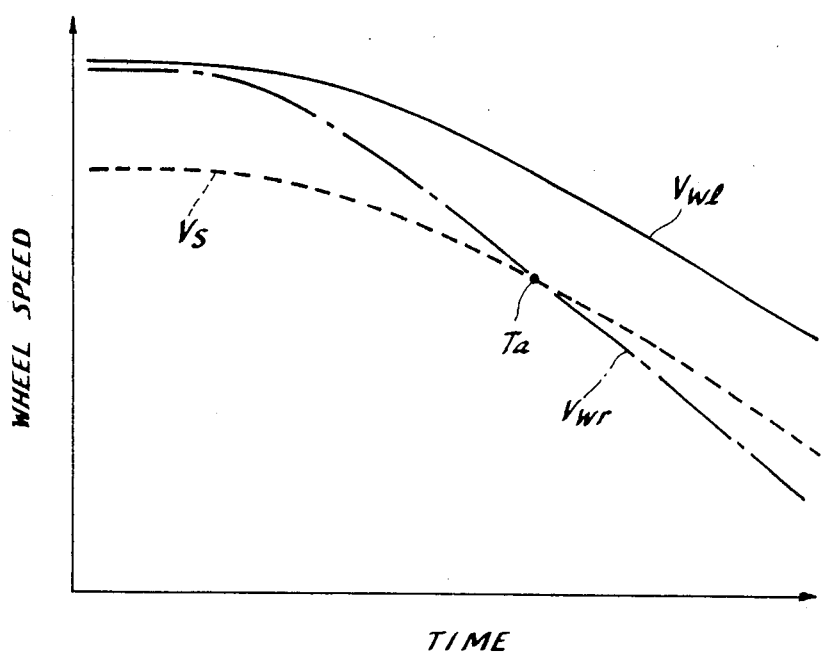
FIG. 1 is a graphic illustration of the rotational speeds of right and left wheels plotted as a function of time when vehicle is running on a curved path.
Figure 2:
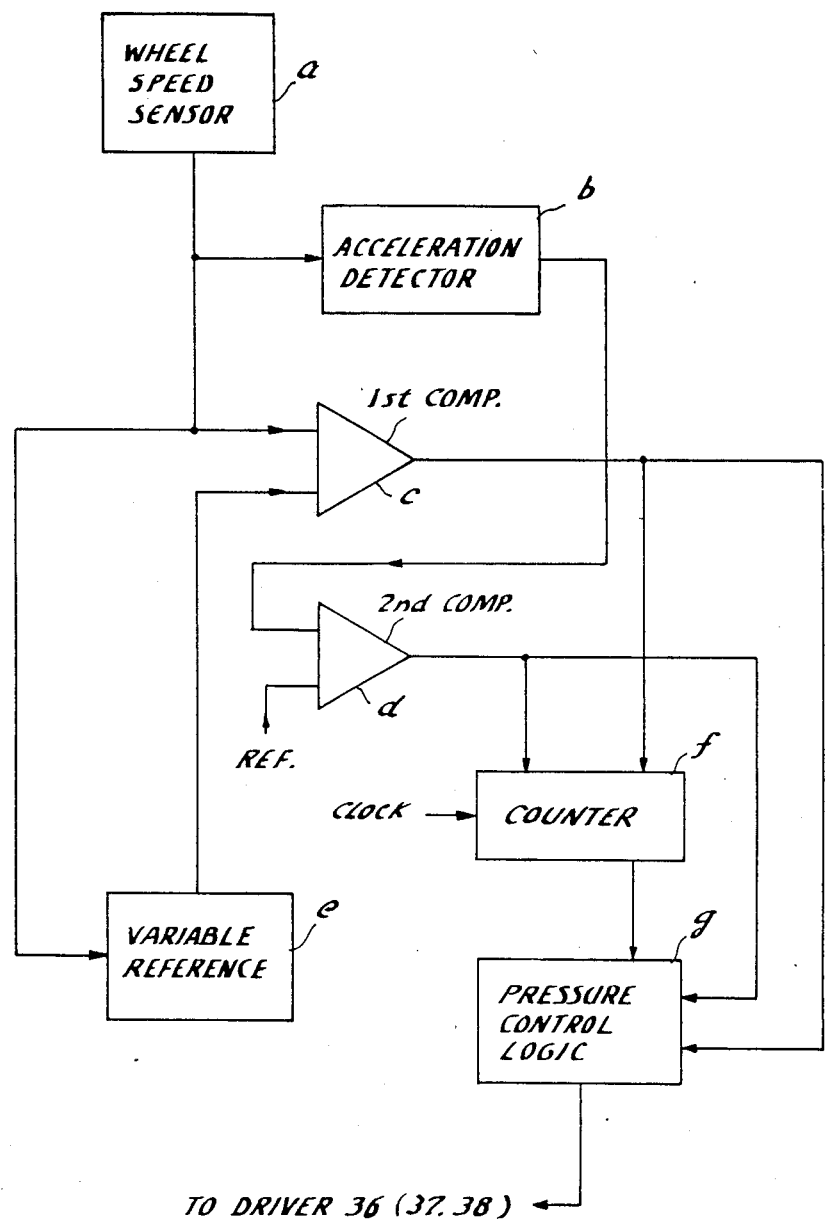
FIG. 2 is a block diagram illustrating a general structure of the antiskid control system of the invention.

The antiskid control system of the present invention represented in FIG. 2 comprises generally a plurality of wheel speed sensors a which generate signals proportional to the speed of associated vehicle wheels. Acceleration detectors b are associated respectively with the wheel speed sensors to generate acceleration signals. A first comparator c provides a comparison between a detected wheel speed signal and a down-pressure determination threshold Vsh which is variable as a function of the speed of the vehicle. This threshold is derived in a variable reference circuit e from the wheel speed signal representing the maximum speed of the wheels. The first comparator generates a first comparator output when the speed is lower than the threshold Vsh. A second comparator d provides comparison between an acceleration signal and a predetermined down-pressure determination threshold $G_1$ and generates a second comparator output when the acceleration is lower than the threshold $G_1$ or a third comparator output when the acceleration is higher than $G_1$.

A counter f measures the period of time during which the first and second comparator outputs from the comparators c and d are simultaneously present. A counter output is generated when this measured period is greater than a predetermined period of time. The outputs of the counter f and comparators c and d are fed to a pressure control logic g. Control logic g operates actuators, or pressure control elements, such that when the first and second comparator outputs are simultaneously present, fluid pressure in the braking system of the vehicle is decreased. A further lowering of the fluid pressure is prevented even though the acceleration rises above the threshold $G_1$ (which would remove the second comparator output) until the counter output is generated.

Figure 3:
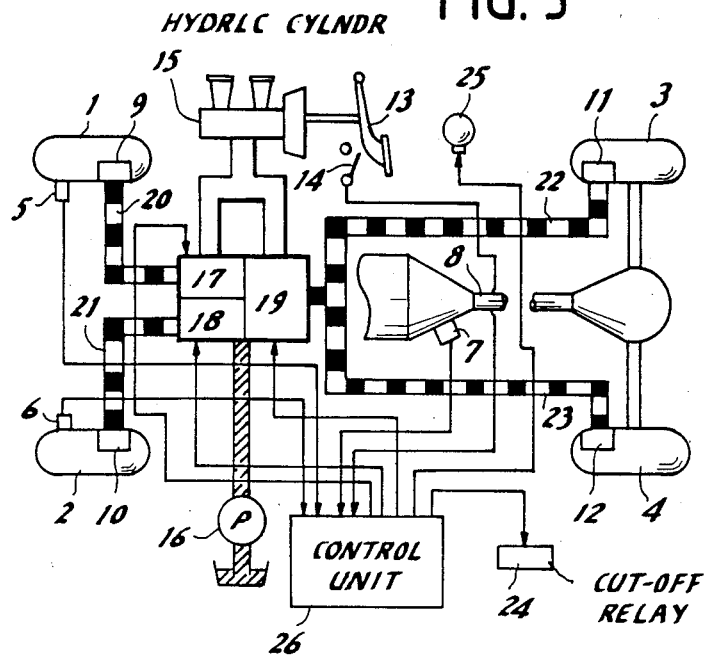
FIG. 3 is an illustration of the mechanical part of the antiskid control system.

FIG. 3 shows a general structure of the antiskid system of the invention incorporated in a rear drive vehicle. When speed sensors 5 and 6 on front-right and front-left wheels 1 and 2 provide front wheel speed signals independently to a control unit 26, and a rear wheel speed sensor 7 is located on a propeller shaft 8 that drives rear-right and rear-left wheels 3 and 4 to provide an average rear wheel speed to the control unit. Pressure control signals are supplied from control unit 26 to solenoid-operated actuators 17, 18, 19 which in turn control pressures of hydraulic brakes 9, 10, 11, 12 mounted on wheels 1, 2, 3, 4 through lines 20, 21, 22, 23, respectively. Brake-pedal ON or OFF signal is fed from stop switch 14 located in proximity to brake pedal 13 to control unit 26. A hydraulic cylinder 15 provides a brake pressure to actuators 17-19 in response to brake pedal 13 being depressed. Solenoid actuators 17-19 are supplied with a constant hydraulic pressure from a pump 16. Control signals are supplied to the actuators 17-19 through a fail-safe cut-off relay 24 from control unit 26. A warning light 25 is provided to alert the vehicle driver when disconnection has occurred in the circuits to the solenoid actuators and stop switch 14.

Figure 4:
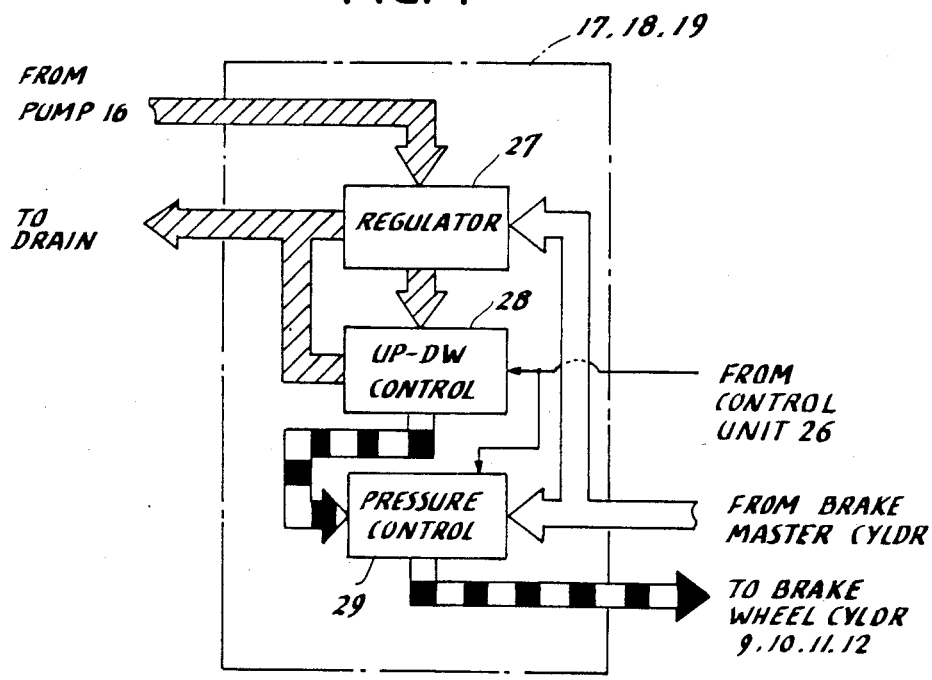
FIG. 4 is an illustration of the detail of the actuators of FIG. 3.

As illustrated in FIG. 4, each of solenoid actuators 17-19 comprises a pressure regulator 27 which is connected to pump 16 to regulate the hydraulic pressure at a constant level. A control valve unit 28 includes a switching solenoid which provides brake pressure up-down control and a pressure control solenoid that controls the gradient of pressure applied to brakes. Further provided in a brake pressure controller 29 including a switching solenoid that provides a high pressure variation when energized and a low pressure variation when de-energized. The output of controller 29 is connected to the brake wheel cylinder of the associated brake.

Figure 5:
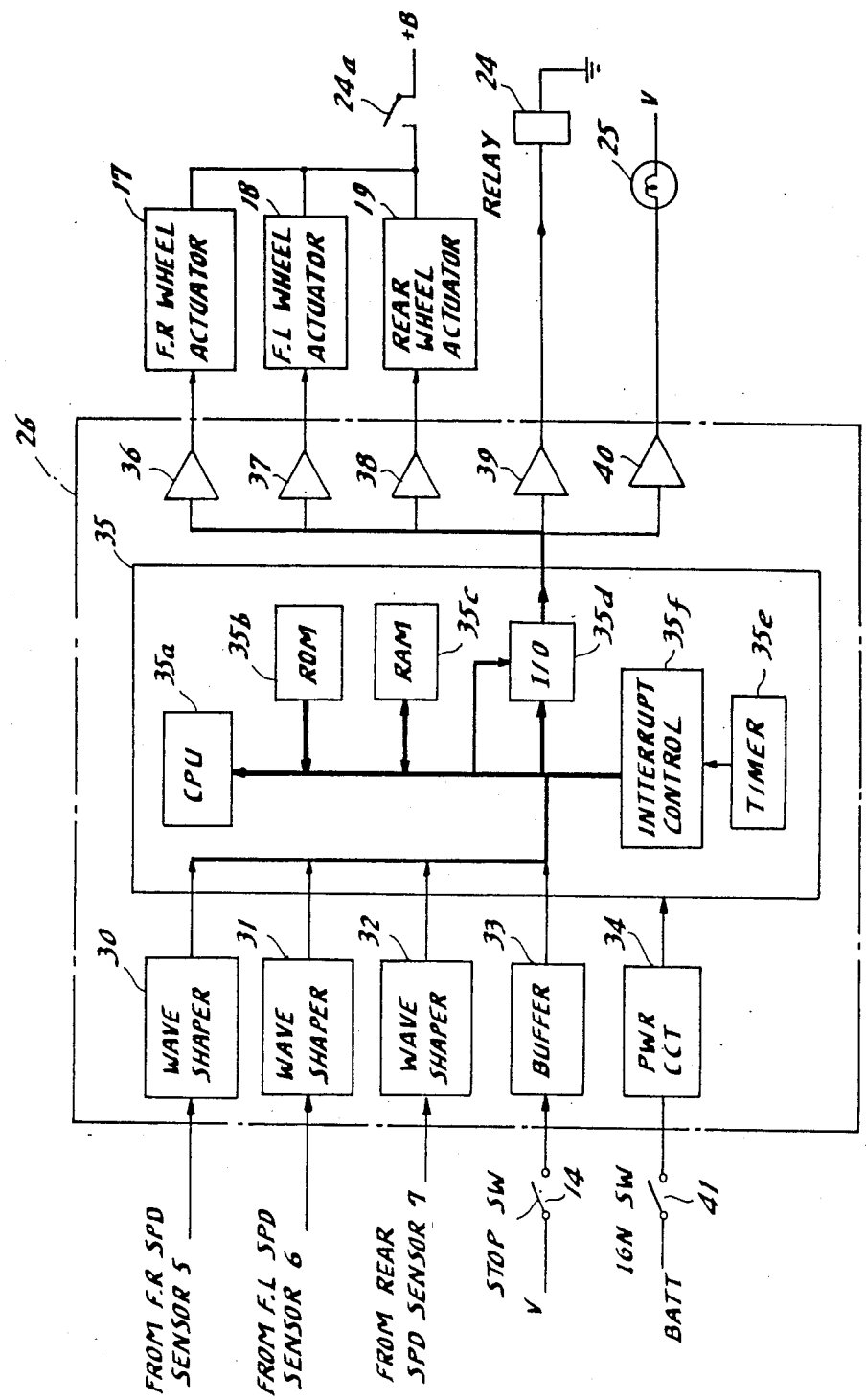
FIG. 5 is an illustration of the detail of the control unit of FIG. 3.

FIG. 5 is an illustration of the detail of control unit 26. When speed signals from sensors 5, 6, 7 are shaped into rectangular pulses by waveshaping circuits 30, 31, 32 and stop signal from switch 14 is fed to a buffer 33. Microcomputer 35, which is powered by circuit 34 in response to ignition switch 41, includes a microprocessor (CPU) 35a that receives these signals through an input/output port 35d to perform operations according to programmed instructions stored in read-only memory 35b. Temporary data are stored in RAM 35c during the process of data input which will be described in detail later. Brake control signals from microcomputer 35 are fed through drivers 36, 37, 38 to solenoid-operated actuators 17, 18, 19, respectively, which are connected in circuit with the relay contacts 24a of cut-off relay 24 which is energized by a driver 39. Driver 40 energizes warning light 25 under control of microcomputer 35. A timer 35e provides a timing pulse at regular intervals to an interrupt control unit 35f which in response to the timing pulse issues an interrupt command to microprocessor 35a. As will be described later, the microprocessor interrupts its main routine execution to execute a timer interrupt subroutine in which it selects an appropriate brake pressure gradient pattern and operates the actuators 17-19.

Figure 6:
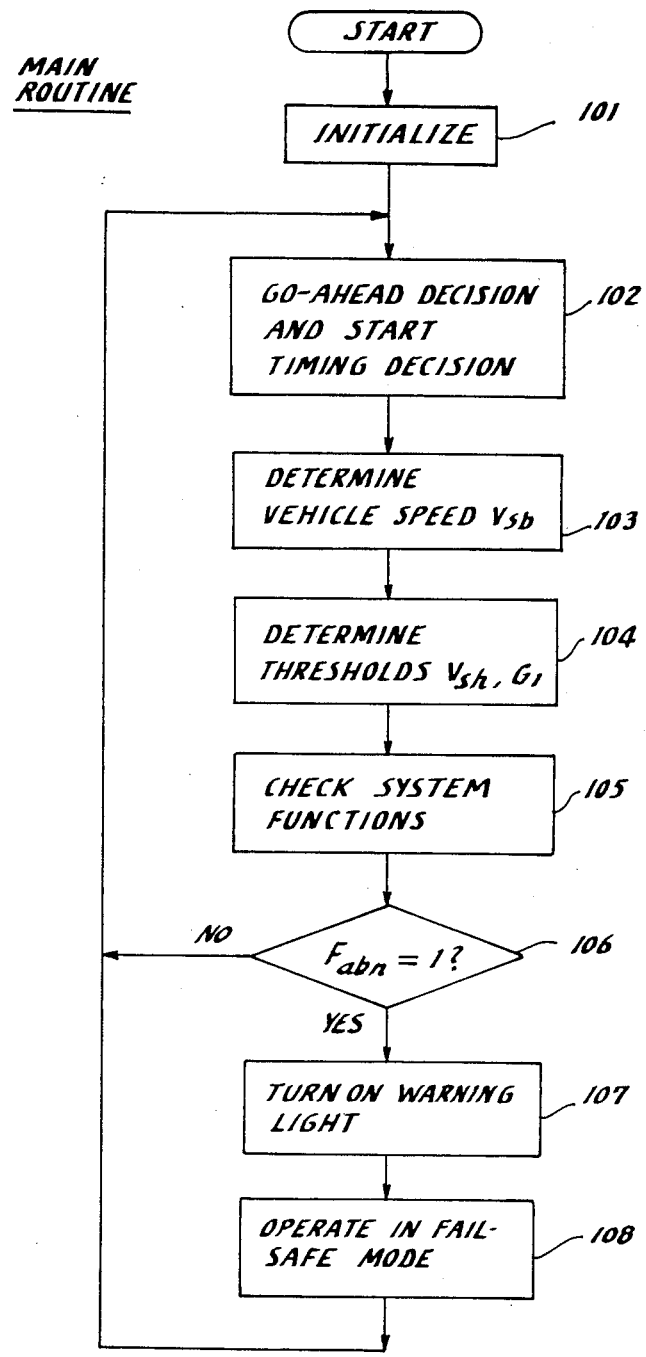
FIG. 6 is an illustration of a flow diagram describing a main routine executed by the microprocessor of FIG. 5.
Figure 7:
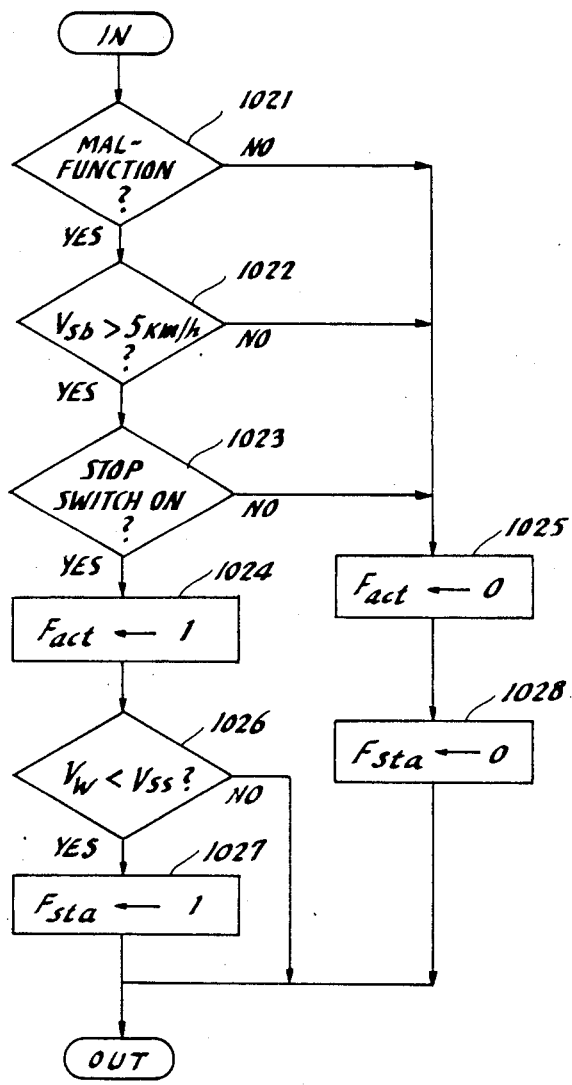
FIG. 7 is a flow diagram of the go-ahead and start timing decision subroutine of FIG. 6.

When ignition switch 41 is turned on, microcomputer 35 initiates executing instructions stored in ROM 35b. The program shown in FIG. 6 starts with a block 101 where various temporary data such as flags are initialized. Control is passed to a subroutine 102 in which an antiskid control go-ahead decision and start timing decision are made. As shown in FIG. 7, subroutine 102 comprises three successive steps 1021 to 1023 for making decisions by proceeding with a block 1021 in which the microcomputer checks if the antiskid system is functioning properly. In block 1022, vehicle speed Vsb is compared with a reference speed (5 km/h, for example) to detect if the vehicle is higher than the reference, and in block 1023 the ON-state of stop switch 14 is detected. If these decisions are all affirmative, control is passed to a block 1024 to set go-ahead flag $F_{act}$ and if any one of these decisions is negative control is passed to blocks 1025 and 1028 in succession to reset go-ahead flag $F_{act}$ and control start flag $F_{sta}$, respectively. Block 1026 is then executed to detect if any one of sensed wheel speed values Vw is lower than a reference speed Vss which represents the upper limit for effecting antiskid control. Control is passed to block 1027 to set control start flag $F_{sta}$ if the speed value Vw becomes lower than a predetermined threshold speed Vss which is used to determine whether the wheel speed is reduced to a level appropriate for effecting antiskid control.

Figure 8:
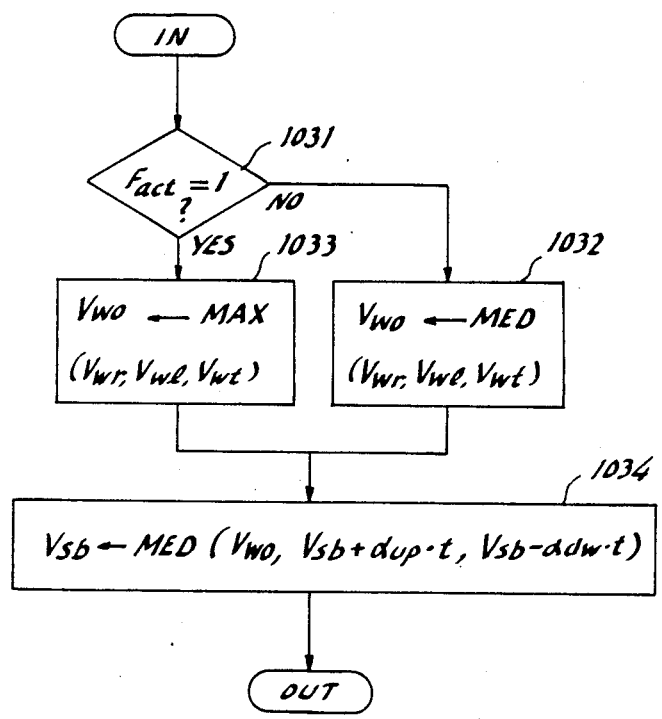
FIG. 8 is a flow diagram describing a vehicle speed determination subroutine of FIG. 6.

As shown in FIG. 2, microprocessor then proceeds to subroutine 103 which is shown in detail in FIG. 8 in which vehicle speed Vsb is estimated on the basis of detected wheel speeds. Block 1031 checks whether go-ahead flag $F_{act}$ has been set up. If $F_{act}=0$, control is passed to block 1032 to derive a reference wheel speed value Vwo from a medium value of front-right, front-left and rear wheel speed values Vwr, Vwl, Vwt. If $F_{act}=1$, control is passed to block 1033 to derive the reference wheel speed Vwo from the maximum of these wheel speeds. In a subsequent block 1034, a previously derived vehicle speed value Vsb is trimmed by the amount of vehicle acceleration or deceleration and a medium value of the reference speed Vwo and the trimmed vehicle speeds is detected as an estimated value of current vehicle speed.

The microprocessor now proceeds to a subroutine 104 to derive down-pressure decision threshold values Vsh and $G_1$ as a function of vehicle speed Vsb derived in subroutine 103 and proceeds to a system check subroutine 105 in which the microprocessor checks system functions for abnormal conditions.

Figure 9:
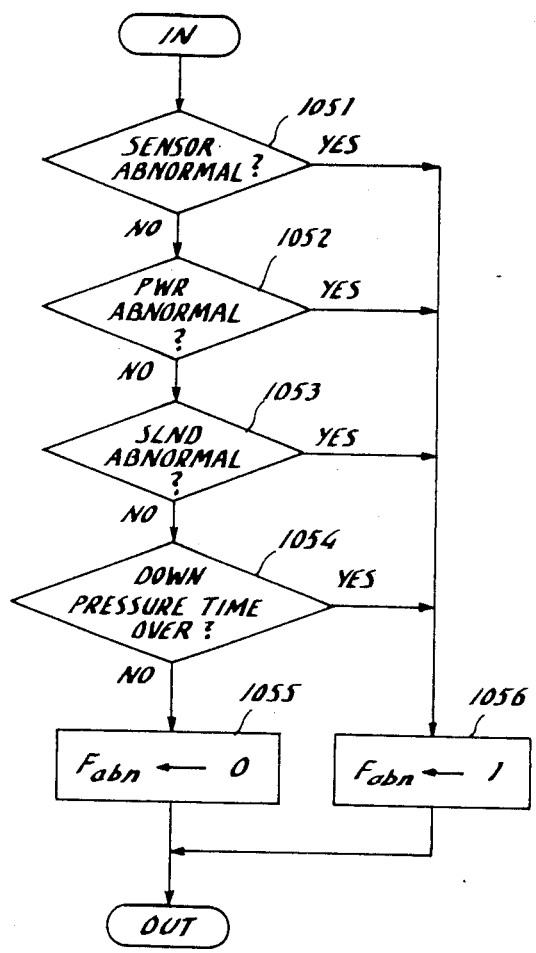
FIG. 9 is a flow diagram describing a system check subroutine of FIG. 6.

As shown in FIG. 9, the subroutine 105 comprises blocks 1051 to 1056. In block 1051, wheel speed sensors 5–7 are checked for abnormalities such as disconnection and short-circuit condition. The source voltage of power circuit is checked in block 1052 for under- or over-voltage condition. Actuator solenoids are checked in block 1053 for disconnection and short-circuit and the down pressure operation is checked in block 1054 for abnormal prolongation. If all these functions are normal, control is passed to block 1055 to reset an abnormal flag $F_{abn}$, and if any abnormality is detected, abnormal flag $F_{abn}$ is set up in block 1056.

The microprocessor now proceeds to a step 106 to check the status of abnormal flag $F_{abn}$. If $F_{abn}=0$, indicating that no abnormality is detected, control is jumped to subroutine 102 to repeat the executions described above, and if $F_{abn}=1$, control is passed to a subroutine 107. In subroutine 107 a control signal is applied to indicator driver 40 which latches it and drives the warning light 25 to alert the vehicle occupant.

A fail-safe subroutine 108 is executed by energizing the cut-off relay 24 to cut off the circuits to the actuators 17–19. Thus, the system is allowed to operate in a manual mode in which the brake pressure is applied in response to the depression of brake pedal in the usual manner. It is preferable that an arrangement be made to cut off the input circuits to actuator drivers 36–38 to ensure against the abnormality of cut-off relay 24.

Figure 10:
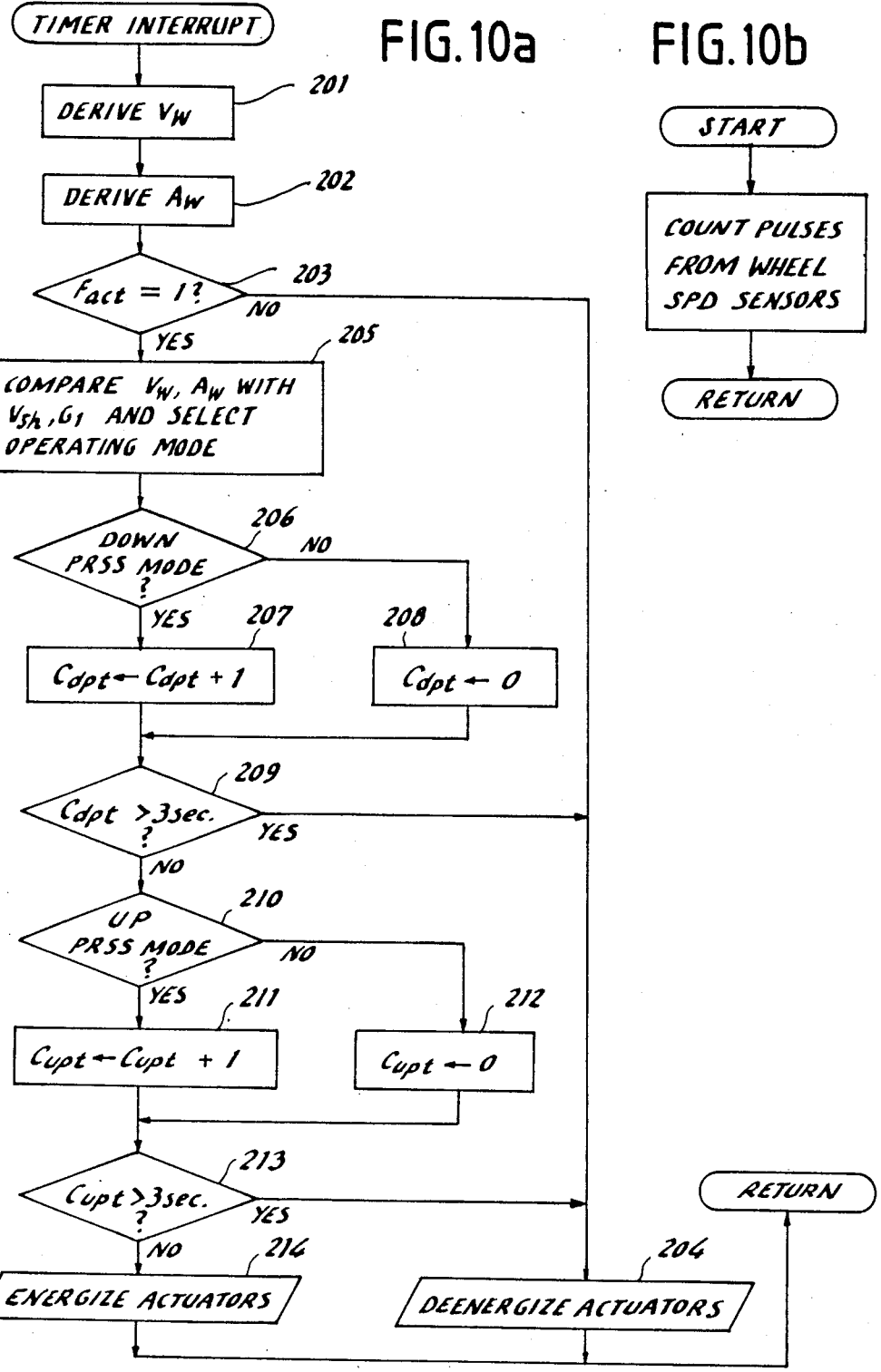
FIGS. 10a and 10b are flow diagrams illustrating interrupt subroutines.

FIGS. 10a and 10b are illustrations of a timer interrupt subroutine which is executed at regular intervals during program execution of the main routine. The interrupt routine starts with block 201 in which wheel speed Vw is determined for each of the wheels based on data derived in a wheel speed interrupt routine shown in FIG. 10b by which the main routine is also interrupted in response to the occurrrence of each wheel speed pulse. More specifically, three wheel speed interrupt programs are provided having different priorities to count simultaneously occurring wheel speed pulses at different timing and store the count values in addressible locations of the RAM. In block 201, the counted wheel speed pulses are read from the RAM to detect the difference between the wheel speed count of the previous execution and that derived in the current execution to derive a wheel speed digital value. Wheel acceleration Aw is derived in block 202 by taking a difference between wheel speed values successively derived from each wheel. In blocks 201 and 202 digital filtering techniques may be employed to smooth out insignificant fluctuations.

Control is now passed to block 203. If the go-ahead decision is not present, control is jumped to block 204 to deenergize actuators 17–19 so that they return to the inoperative state immediately following the go-ahead flag $F_{act}$ being reset. If $F_{act}=1$ in block 203, control is passed to threshold comparison and mode select subroutine which compares wheel speed and acceleration values Vw, Aw with reference values Vsh and $G_1$ respectively and determine a pressure increase or decrease mode, the details of which will be described later.

Control is then advanced to block 206 to check if a down-pressure mode is selected in subroutine 205 and if so, a down-pressure time counter $C_{dpt}$ is incremented by one in block 207, and if not this counter is reset in block 208.

In block 209, the microprocessor checks if down-pressure time counter $C_{dpt}$ exceeds a preset limit, typically 3 seconds. If this limit is exceeded, the actuators 17–19 are deenergized in block 204 and if not, control is passed to block 210 to detect if the selected mode is an up-pressure mode. An up-pressure time counter $C_{upt}$ is incremented by one in block 211 if the up-pressure mode is detected. If not in up-pressure mode, this counter is reset in block 212. If the counter $C_{upt}$ indicates a 3-second period (block 213), actuators are deenergized, and if not, they remain energized (block 214).

Figure 11:
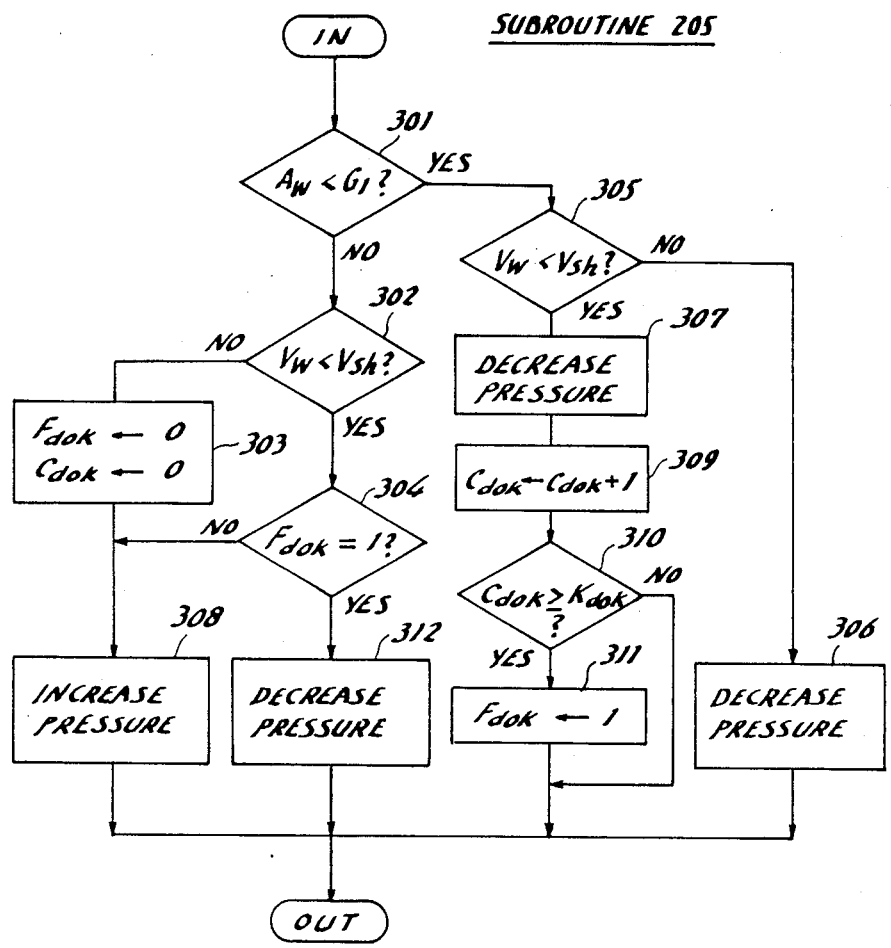
FIG. 11 is a flow diagram describing details of the comparison and mode selection subroutine of FIG. 10a according to the present invention.

FIG. 11 is an illustration of the details of threshold comparison and mode selection subroutine 205 of FIG. 10a. Subroutine 205 is executed for each wheel speed signal. However, only one such execution will be described for simplicity. In block 301, wheel acceleration value Aw, which was derived in block 202, FIG. 10a, is compared with a down-pressure decision threshold $G_1$ for detecting the timing at which the wheel speed drops rapidly. In this regard, the threshold $G_1$ represents a negative value. If $Aw > G_1$, control is passed to block 302 to compare between wheel speed value Vw and a down pressure decision threshold Vsh. If $Vw > Vsh$, the exit is to block 303 which resets both down-pressure flag $F_{dok}$ and down-pressure counter $C_{dok}$ to zero, the execution of block 303 being followed by execution of block 308 by which an up-pressure mode is selected. If $Vw < Vsh$ in block 302, control is passed to block 304 to check if down-pressure flag $F_{dok}$ has been established. Depending on the status of the down-pressure flag, up-pressure mode block 308 or down-pressure mode block 312 is selected as long as conditions $Aw > G_1$ and $Vw < Vsh$ exist simultaneously. If Aw becomes smaller than $G_1$, down-pressure flag $f_{dok}$ is set up in block 311 after blocks 305, 307, 309 and 310 are executed.

If $Aw < G_1$ in block 301, control exits to block 305 to make a comparison between Vw and Vsh. If $Vw > Vsh$, a down-pressure mode is selected (block 306) to decrease the brake pressure.

If both acceleration and wheel speed values are smaller than the respective thresholds, control is passed to block 307 to select a down-pressure mode 307. Execution of block 307 is followed by block 309 in which down-pressure counter $C_{dok}$ is incremented by one. Control is then passed to block 310 to compare the count with a reference time represented by $K_{dok}$. A suitable value for the reference time is 20 milliseconds. Block 311 is bypassed until the count reaches the reference time. With $C_{dok} \geq K_{dok}$, down-pressure flag $F_{dok}$ is set up in block 311.

It is known that upon application of brake to a given wheel, it decelerates at a rate higher than its speed decreases and upon release of the brake, as effected in response to a down pressure operation, the wheel begins accelerating at a rate higher than the rate at which wheel speed increases, so that the speed value has peaks and valleys which occur at times delayed with respect to the corresponding peaks and valleys of the wheel acceleration.

Let it be assumed that vehicle wheels have equal diameters and the vehicle is running on a straight path. Upon application of the brake, the antiskid go-ahead decision will be taken in subroutine 102, setting up go-ahead decision flag $F_{act}$. With $F_{act}=1$, subroutine 205 is executed and different situations occur in a series of successive phases. In phase 1, control passes through blocks 301 and 302 to block 303 since both Aw and Vw are initially higher than the respective thresholds and the up-pressure mode is selected (block 308). In phase 2, acceleration Aw becomes lower than $G_1$ and control passes through blocks 301 and 305 to block 306 to execute down-pressure operation. In phase 3, both Aw and Vw become lower than $G_1$ and Vsh, so that control is passed through blocks 301 and 305 to block 307 to continue the down-pressure operation. If light brake is applied, phase 3 will continue for a period smaller than the reference period $K_{dok}$ and control is passed through blocks 309 and 310 and returns to the main routine. If heavy brake is applied, phase 3 will continue for a period longer than the reference period and counter $C_{dok}$ exceeds $K_{dok}$ (block 310) and down-pressure flag $F_{dok}$ is set up in block 311. Therefore, if light brake continues, wheel acceleration becomes equal to or greater than $G_1$ with $F_{dok}=0$ and control passes through block 304 to block 308, increasing the brake pressure (phase 4A). If heavy brake acceleration Aw becomes equal to or greater than $G_1$ with $F_{dok}=1$ and control exits from block 304 to block 312 to continue the down-pressure mode (phase 4B).

The sequence of events just described are summarized as follows:

| Phase | Acceleration | Wheel Speed | Flag | Pressure Gradient |
|---|---|---|---|---|
| 1 | Aw ≧ $G_1$ | Vw ≧ Vsh | — | Uphill |
| 2 | Aw < $G_1$ | Vw ≧ Vsh | — | Downhill |
| 3 | Aw < $G_1$ | Vw < Vsh | — | Downhill |
| 4A | Aw ≧ $G_1$ | Vw < Vsh | 1 | Downhill |
| 4B | Aw ≧ $G_1$ | Vw < Vsh | 0 | Uphill |

Therefore, a light braking action on a straight path will cause the microprocessor to cyclically execute phases 1, 2, 3 and 4A and a heavy braking action will cause it to cyclically execute phases 1, 2, 3 and 4B.

If wheel speed values differ from one another, a condition that occurs if there is a difference in wheel diameter or if the vehicle is cornering, the application of the brake results in a condition in which the acceleration value Aw of one wheel is greater than the threshold $G_1$ and the speed value Vw of that wheel is smaller than Vsh while such conditions do not occur on the other wheels. Such conditions occur on wheels having a larger diameter or on wheels following a smaller radius. Under such conditions, phase 4B initially occurs and control is passed through blocks 301, 302, 304 to block 308 as down-pressure flag is not yet set at this moment. Subsequently, acceleration Aw reduces below $G_1$ and occurs and hence blocks 301, 305, 307 and 309 are executed successively phase 3.

If the braking is of short duration, the down-pressure flag will not be set up in block 311 and a subsequent increase in acceleration to a level above the threshold $V_1$ will cause phase 4B to occur. Thus, the microprocessor executes phase 4B only, or executes recyclically phases 4B and 3. This prevents excessive brake pressure reduction during light breaking operations.

If the braking is of longer duration, phase 3 is executed as in the previous light braking operation, but down-pressure flag is established in block 311. Subsequently, phase 4A is executed to continue down-pressure operation (block 312). This prevents premature locking of wheels under heavy braking operations.

The foregoing description shows only a preferred embodiment of the present invention. Various modifications are apparent to those skilled in the art without departing from the scope of the present invention which is only limited by the appended claims. For example, wheel speed values may be compared with an additional threshold for making a decision on down-pressure operation to minimize the effect resulting from road surface fluctuations (known as "surface noise") and wheel acceleration values may be compared with an additional threshold by which the decision on commencement of up-pressure operation can be taken.

What is claimed is:

1. An antiskid control system for the hydraulic braking system of a wheeled vehicle having means for lowering fluid pressure of said braking system, comprising:
    first means for generating a wheel speed signal proportional to a speed of a vehicle wheel, and an acceleration signal proportional to an acceleration of the vehicle wheel;
    second means for generating a variable threshold as a function of a speed of said vehicle;
    third means for comparing said wheel speed signal with said threshold and generating a first comparator output when the speed signal is lower than said variable threshold;
    fourth means for comparing said acceleration signal with a reference value and generating a second comparator output when the acceleration signal is lower than said reference value to thereby establish:
    a first condition in which said first and second comparator outputs are not present;
    a second condition in which only said second comparator output is present;
    a third condition in which both of said first and second comparator outputs are present; and
    a fourth condition in which only said first comparator output is present; and
    fifth means for disabling said pressure lowering means in response to an occurrence of any of: (a) said first condition, (b) said fourth condition when occurring prior to said third condition, and (c) said fourth condition when occurring immediately following said third condition having occurred for a short duration less than a threshold, and for enabling said pressure lowering means in response to said second and third conditions and continuing said enabling during an occurrence of said fourth condition occuring immediately following said third condition of long duration.

2. An antiskid control system as claimed in claim 1, further comprising means for generating a second wheel speed signal proportional to a speed of a second vehicle wheel, and wherein said second means derives said variable threshold as the greater of the first-mentioned wheel speed signal and said second wheel speed signal.

3. An antiskid control system for the hydraulic braking system of a wheeled vehicle having means for lowering the fluid pressure, comprising:
 speed detector means for generating a speed signal proportional to the speed of a vehicle wheel; and
 data processing means for: (1) deriving an acceleration signal representative of the acceleration of the vehicle wheel from the speed signal, (2) deriving a variable threshold as a function of the speed of said vehicle, (3) making a comparison between said speed signal and said variable threshold and generating a first comparison signal when said speed signal is lower than said threshold, (4) making a comparison between said acceleration signal and a reference value and generating a second comparison signal when the acceleration signal is lower than the reference value to thereby establish a first condition in which said first and second comparison signals do not exist, a second condition in which only said second comparison signal exists, a third condition in which both of said first and second comparison signals coexist, and a fourth condition in which only said first comparison signal exists, (5) disabling said pressure lowering means in response to any of: (a) said first condition, (b) said fourth condition occuring prior to said third condition, and (c) said fourth condition occuring immediately following said third condition having occurred for a duration shorter than a reference and (6) enabling said pressure lowering means in response to said second and third conditions and continuing the enablement in response to said fourth condition occuring immediately following said third condition of long duration.

4. An antiskid control system as claimed in claim 3, wherein said data processing means is also for:
 (a) resetting a flag in response to said first condition;
 (b) disabling the pressure lowering means in response to said flag being reset;
 (c) enabling said pressure lowering means in response to said second and third conditions;
 (d) measuring a period of time during which said third condition exists;
 (e) setting said flag when the measured period exceeds a predetermined period;
 (f) detecting in response to said fourth condition if said flag is set or reset;
 (g) if said flag is detected as being set, enabling said pressure lowering means; and
 (h) if said flag is detected as being reset, disabling said pressure lowering means.

5. A method for controlling hydraulic pressure applied to brakes of a wheeled vehicle, comprising the steps of:
 (a) detecting a speed of rotation of a wheel of said vehicle;
 (b) detecting an acceleration of said wheel;
 (c) generating a variable threshold that is a function of the speed of said vehicle;
 (d) generating a first signal when said speed is lower than said threshold;
 (e) generating a second signal when the acceleration is lower than a reference value to thereby establish a first condition in which said first and second comparison signals do not exist, a second condition in which only said second comparison signal exists, a third condition in which both of said first and second comparison signals coexist and a fourth condition in which only said first comparison signal exists;
 (f) increasing the pressure in response to any of (a) said first condition, (b) said fourth condition occurring prior to the third condition, and (c) said fourth condition occuring immediately following said third condition having occurred for a short duration less than a duration reference;
 (g) lowering the pressure in response to said second and third conditions; and
 (h) lowering the pressure following the step (g) in response to said fourth condition occurring immediately following the third condition having occurred for a long duration greater than said duration reference.

* * * * *